(12) United States Patent
Lin et al.

(10) Patent No.: US 11,043,901 B2
(45) Date of Patent: Jun. 22, 2021

(54) FULL BRIDGE CONVERTER HAVING WIDE OUTPUT VOLTAGE RANGE

(71) Applicant: National Taiwan University of Science and Technology, Taipei (TW)

(72) Inventors: Jing-Yuan Lin, New Taipei (TW); Shih-Min Lin, Miaoli County (TW); Hsuan-Yu Yueh, Taoyuan (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 16/808,599

(22) Filed: Mar. 4, 2020

(65) Prior Publication Data

US 2021/0152095 A1    May 20, 2021

(30) Foreign Application Priority Data

Nov. 15, 2019  (TW) ................................. 108141493

(51) Int. Cl.
*H02M 3/335* (2006.01)
*H02M 1/088* (2006.01)
*H02M 1/00* (2006.01)

(52) U.S. Cl.
CPC ....... *H02M 3/33576* (2013.01); *H02M 1/088* (2013.01); *H02M 2001/0077* (2013.01)

(58) Field of Classification Search
CPC ............. H02M 3/335; H02M 3/33507; H02M 3/33538; H02M 3/33576; H02M 3/33592; H02M 2001/0077; H02M 2001/0083; H02M 1/088
See application file for complete search history.

(56) References Cited

U.S. PATENT DOCUMENTS

| 7,002,818 B2 * | 2/2006 | Hamilton .......... H02M 3/33592 363/127 |
| 9,577,539 B2 * | 2/2017 | Sakita ................. H02M 3/1584 |
| 2012/0170320 A1 * | 7/2012 | Lee ......................... H02J 3/381 363/16 |
| 2017/0353111 A1 * | 12/2017 | Elasser ................... H02M 1/08 |

FOREIGN PATENT DOCUMENTS

WO    WO-2013013858 A1 *    1/2013    ........ H02M 3/33584

* cited by examiner

*Primary Examiner* — Gary L Laxton
(74) *Attorney, Agent, or Firm* — Li & Cai Intellectual Property (USA) Office

(57) ABSTRACT

A full bridge converter having a wide output voltage range includes an input power source, a full bridge switching circuit, a transformer, a first rectifying circuit, a second rectifying circuit, a first output circuit, a second output circuit, and a control circuit. The transformer includes a magnetic core, a primary side winding, a first secondary side winding, and a second secondary side winding. The first rectifying circuit includes a first AC switch, a second AC switch and a first freewheeling diode, and the second rectifying circuit includes a third AC switch, a fourth AC switch and a second freewheeling diode. The control circuit, according to a duty cycle, controls the first AC switch and the third AC switch to be turned on during a positive half cycle, and controls the second AC switch and the fourth AC switch to be turned on during a negative half cycle.

10 Claims, 11 Drawing Sheets

FULL BRIDGE CONVERTER HAVING WIDE OUTPUT VOLTAGE RANGE

CROSS-REFERENCE TO RELATED PATENT APPLICATION

This application claims the benefit of priority to Taiwan Patent Application No. 108141493, filed on Nov. 15, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a full bridge converter, and more particularly to a full bridge converter having a wide output voltage range.

BACKGROUND OF THE DISCLOSURE

A power switch of an existing full bridge transformer uses hard switching, which results in large switching losses, and can easily generate electromagnetic interference (EMI) since a voltage and a current change at the moment of switching is large. When the hard switching is used in a case where an output voltage range is wide, a turns ratio of the transformer must be adjusted appropriately, which will not only increase the volume of a circuit, but also greatly increase an influence of parasitic components on the circuit.

On the other hand, in order to provide a wide range of output voltages to fulfill certain requirements, a full bridge LLC series resonant converter (LLC-SRC) is a commonly used circuit architecture as a first stage circuit to be isolated, and provides better conversion efficiency, and a buck converter as a second stage is connected in series to the first stage to achieve an adjustment for the output voltage. The LLC-SRC can make a power switch on a primary side achieve zero voltage switching by designing of a resonant tank and a switching frequency. Although the LLC-SRC can change a voltage gain by adjusting the switching frequency, it is not suitable for a wide range of adjustments since its virtual work increases when the switching frequency being far away from the resonance frequency and a core loss of the transformer increases as the frequency increases, thereby reducing an efficiency of the LLC-SRC.

The circuit architecture mainly uses the turns ratio of the transformer to increase an output voltage of the first stage, and the buck converter of the second stage is used to achieve a wide range of the output voltage. Both the first and second levels of this circuit architecture require feedback control, respectively, which is more complicated than other circuits described above, and has a large number of components and a large circuit size.

Therefore, how the above-mentioned defects can be overcome by improvement of the circuit design, so that a higher output voltage can be provided to achieve a wide range of output voltage applications without increasing the turns ratio of the transformer, has become an important issue in the art.

SUMMARY OF THE DISCLOSURE

In response to the above-referenced technical inadequacies, the present disclosure provides a full bridge converter having a wide output voltage range.

In one aspect, the present disclosure provides a full bridge converter having a wide output voltage range includes an input power source, a full bridge switching circuit, a transformer, a first rectifying circuit, a second rectifying circuit, a first output circuit, a second output circuit, and a control circuit. The full bridge switching circuit is coupled to the input power source. The transformer is coupled to the full bridge switching circuit and includes a magnetic core, a primary side winding wound around a primary side of the magnetic core, and a first secondary side winding and a second secondary side winding wound around a secondary side of the magnetic core. The first rectifying circuit is connected to the transformer and includes a first alternating current switch, a second alternating current switch and a first freewheeling diode. The first AC switch is connected between one end of the first secondary side winding and a third node, the second AC switch is connected between another end of the first secondary side winding and the third node, and the first freewheeling diode is connected between the third node and a fourth node. The fourth node is connected to a first center point of the first secondary side winding. The second rectifying circuit is connected to the transformer and includes a third AC switch, a fourth AC switch, and a second freewheeling diode. The third AC switch is connected between one end of the second secondary side winding and a fifth node, the fourth AC switch is connected between another end of the second secondary side winding and the fifth node, the second freewheeling diode is connected between the fifth node and a sixth node, and the sixth node is connected to a second center point of the second secondary side winding. The first output circuit is connected between the third node and the fourth node, includes a first output inductor and a first output capacitor, and has a first output node. The second output circuit is connected to the first output circuit and between the fifth node and the sixth node, and the second output circuit includes a second output inductor and a second output capacitor, and has a second output node. The control circuit is configured to, according to a duty cycle, control the first AC switch and the third AC switch to be turned on during a positive half cycle, and control the second AC switch and the fourth AC switch during a negative half cycle.

Therefore, the full bridge converter having a wide output voltage range provided by the present disclosure limits an occurrence of freewheeling by using AC switches, provides discharge paths by adding two freewheeling diodes to a rectifier, and connects an output capacitor in series, thereby providing a higher output voltage without increasing a turns ratio of the transformer to achieve an application for a wide range of an output voltage.

In addition, in the full bridge converter having the wide output voltage range provided by the present disclosure, two power switches constituting the AC switch will be given same control signals, and times at which energy being transferred to two groups of the secondary side can be staggered, thereby reducing a current stress and a component loss of the primary side. Moreover, the circuit design can make the power switches of the primary side achieve zero voltage switching (ZVS). Compared with the LLC-SRC, this architecture can integrate two stages of circuit into a single stage, which is much simpler to be controlled.

These and other aspects of the present disclosure will become apparent from the following description of the embodiment taken in conjunction with the following drawings and their captions, although variations and modifications therein may be affected without departing from the spirit and scope of the novel concepts of the disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
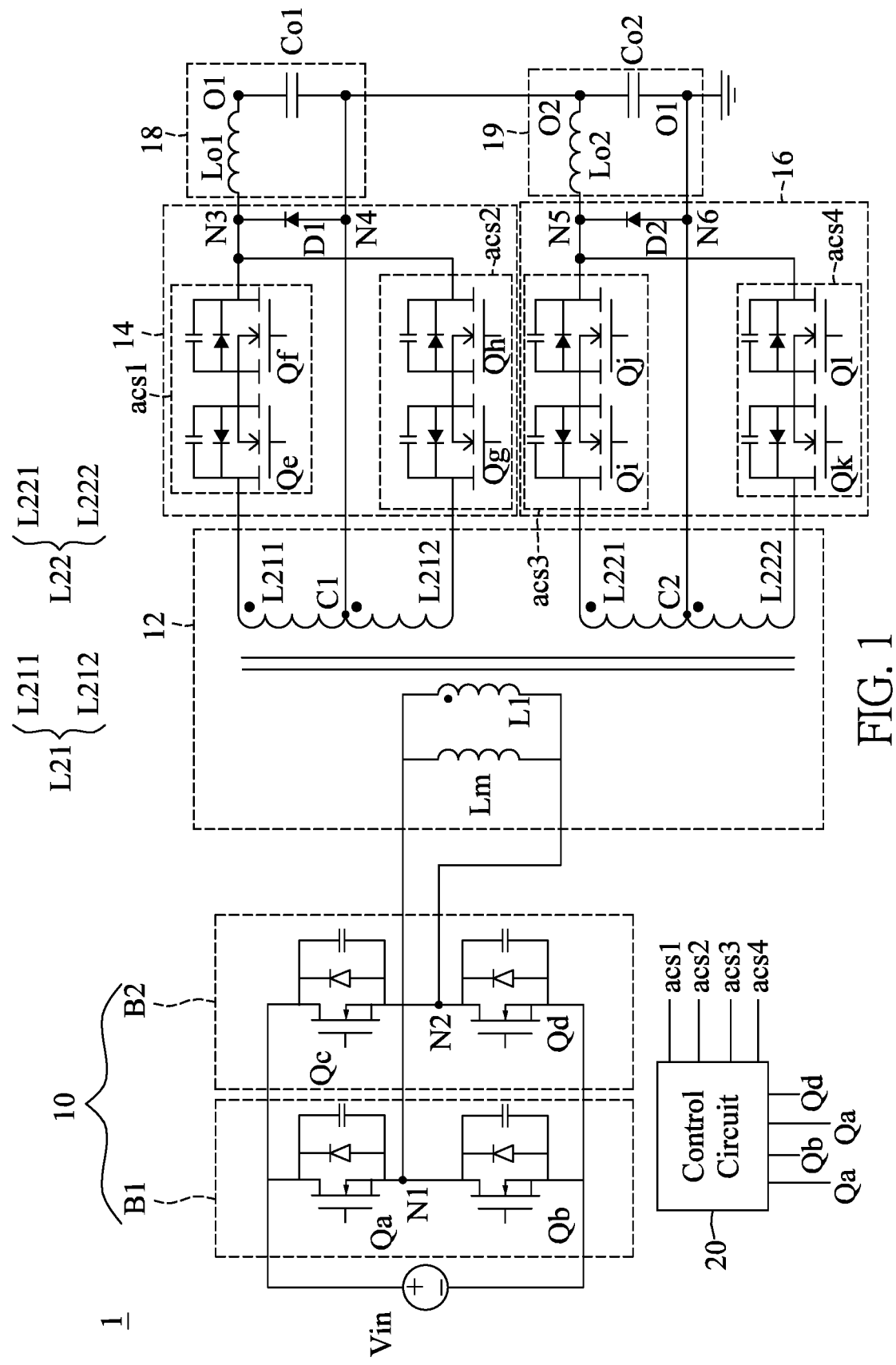
FIG. 1 is a circuit layout of a full bridge converter having a wide output voltage range according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit layout of a full bridge converter having a wide output voltage range according to an embodiment of the present disclosure. An embodiment of the present disclosure provides a full bridge converter 1 having a wide output voltage range, the full bridge converter 1 includes an input power source Vin, a full bridge switching circuit 10, a transformer 12, a first rectifying circuit 14, a second rectifying circuit 16, a first output circuit 18, a second output circuit 19 and a control circuit 20.

The full bridge switching circuit 10 is coupled to the input power source Vin. Similar to a traditional full bridge transformer, the full bridge switching circuit 10 can include an upper bridge circuit B1 and a lower bridge circuit B2 connected in parallel. The upper bridge circuit B1 includes a first power switch Qa and a second power switch Qb connected to the first power switch Qa through the first node N1. The lower bridge circuit B2 can include a third power switch Qc and a fourth power switch Qd connected to the third power switch Qc through the second node N2.

Furthermore, in addition to considering a maximum withstand voltage and a maximum withstand current of the power switch, a selection of the power switch must also consider a parasitic capacitance and an on-resistance of the power switch. In order to make a power switch of the primary side achieve zero voltage switching, a switching loss is almost negligible, and only a conduction loss is considered. Therefore, SCT3060 power switch produced by Rohm is selected. The withstand voltage, the withstand current and the on-resistance of the selected power switch can be selected according to requirements. Preferably, the withstand voltage can be between 600 and 700V, such as 650V, the withstand current can be between 30 and 50 A, such as 39 A, and the on-resistance can be between 0.01 and 0.1 ohm, such as 0.06 ohms.

The transformer 12 is coupled to the full bridge switching circuit 10 and includes a magnetic core (not shown), a primary side winding L1 wound on a primary side of the magnetic core, and a first secondary side winding L21 and a second secondary side winding L22 wound on a secondary side of the magnetic core. The primary side winding L1 is connected between a first node N1 and a second node N2, and the primary side of the magnetic core has a magnetizing inductor Lm.

In detail, the magnetic core of a high-frequency transformer can be made of ferrite. For example, an iron core made of model No. Mn—Zn PC40 soft ferrite produced by TDK Company can be used.

The first secondary side winding L21 can include windings L211 and L212, and the second secondary side winding L22 can include windings L221 and L222, so as to form center-tapped windings, respectively. Further, the first rectifying circuit 14 is connected to the transformer 12 and includes a first alternative current (AC) switch acs1, a second AC switch acs2, and a first freewheeling diode D1. As shown, the first AC switch acs1 is connected between one end of the first secondary side winding L21 and a third node N3, the second AC switch acs2 is connected between another end of the first secondary side winding L21 and the third node N3, and the first freewheeling diode D1 is connected between the third node N3 and a fourth node N4.

The fourth node N1 is connected to a first center point C1 of the first secondary side winding L21, and the first secondary side winding L21 is divided into the windings L211 and L212 based on the first central point C1.

Next, the second rectifier circuit 16 is connected to the transformer 12 and includes a third AC switch acs3, a fourth AC switch acs4, and a second freewheeling diode D2. The third AC switch acs3 is connected between one end of the second secondary side winding L22 and a fifth node N5, and the fourth AC switch acs4 is connected between another end of the second secondary side winding L22 and the fifth node N5. The second freewheeling diode D2 is connected between the fifth node N5 and a sixth node N6. The sixth node N6 is connected to a second center point C2 of the second secondary side winding L22, and the second secondary side winding L22 is divided into windings L221 and L222 based on the second central point C2.

Here, the first secondary side winding L21, the second secondary side winding L22, the first rectifying circuit 14 and the second rectifying circuit 16 form two sets of center-tapped rectifying windings. In the present disclosure, for different circuit designs, two or more center-tapped rectifying windings can be used.

In some embodiments, the first AC switch acs1, the second AC switch acs2, the third AC switch acs3, and the fourth AC switch acs4 each include two power switches connected in reverse series. The first AC switch acs1 includes power switches Qe and Qf connected in reverse series, the second AC switch acs2 includes power switches Qg and Qh connected in reverse series, the third AC switch acs3 includes power switches Qi and Qj connected in reverse series, and the fourth AC switch acs4 includes power switches Qk and Ql connected in reverse series.

In detail, a voltage stress of the power switch used on the secondary side should be twice of an input voltage. For example, a power switch of model C2M0040120D produced by Cree can be selected. A withstand voltage, a withstand current, and an on-resistance of the selected power switch can be selected according to requirements. Preferably, the withstand voltage can be between 1000 and 1400V, such as 1200, the withstand current can be between 50 and 70 A, such as 60 A, and the on-resistance can be between 0.01 and 0.1 ohm, such as 0.04 ohm.

The first output circuit 18 is connected between the third node N3 and the fourth node N4, and includes a first output inductor Lo1 and a first output capacitor Co1. The first output inductor Lo1 is connected between the third node N3 and the first output node O1, and the first output capacitor Co1 is connected between the fourth node N4 and the first output node O1.

On the other hand, the second output circuit 19 is connected to the first output circuit 18, and is connected between the fifth node N5 and the sixth node N6. The second output circuit 19 can include a second output inductor Lo2 and a second output capacitor Co2, and has a second output node O2. The second output inductor Lo1 is connected between the fifth node N5 and the second output node O2, and the second output capacitor Co2 is connected between the sixth node N6 and the second output node O2.

The difficulty of a circuit design of an existing full bridge converter will be increased when a turns ratio of the transformer is increased. Therefore, the present disclosure utilizes a multi-winding-transformer full bridge converter, and connects the output capacitors in series to provide a higher output voltage. Here, a circuit structure composed of two sets of center-tapped windings can enable the circuit to be used in a wide range of voltage output when the output voltage gain is greater than 1, while effectively reduce the turns ratio of the transformer and a component stress on the secondary side.

For different circuit designs, two or more center-tapped rectifying windings can be used. Although rectifying components and output filter components are added, the output voltage is evenly distributed across all capacitors since the output capacitors are connected in series, which can make a cross-voltage on any group of output capacitors can be relatively decreased, thereby effectively reducing a difficulty of production and a size of the output filter inductor. In this circuit architecture, the first output inductor Lo1 and the second output inductor Lo2 will be charged simultaneously, and a secondary side current will be mapped back to a primary side current by multiplying a magnification, which is obtained by multiplying a number of center-tapped windings by the turns ratio.

The full bridge converter 1 having a wide output voltage range provided by the present disclosure further includes a control circuit 20, which can be used to control the first to fourth power switches Qa to Qd and the first to fourth AC switches acs1 to acs4 to be turned on and off.

Figure 2:
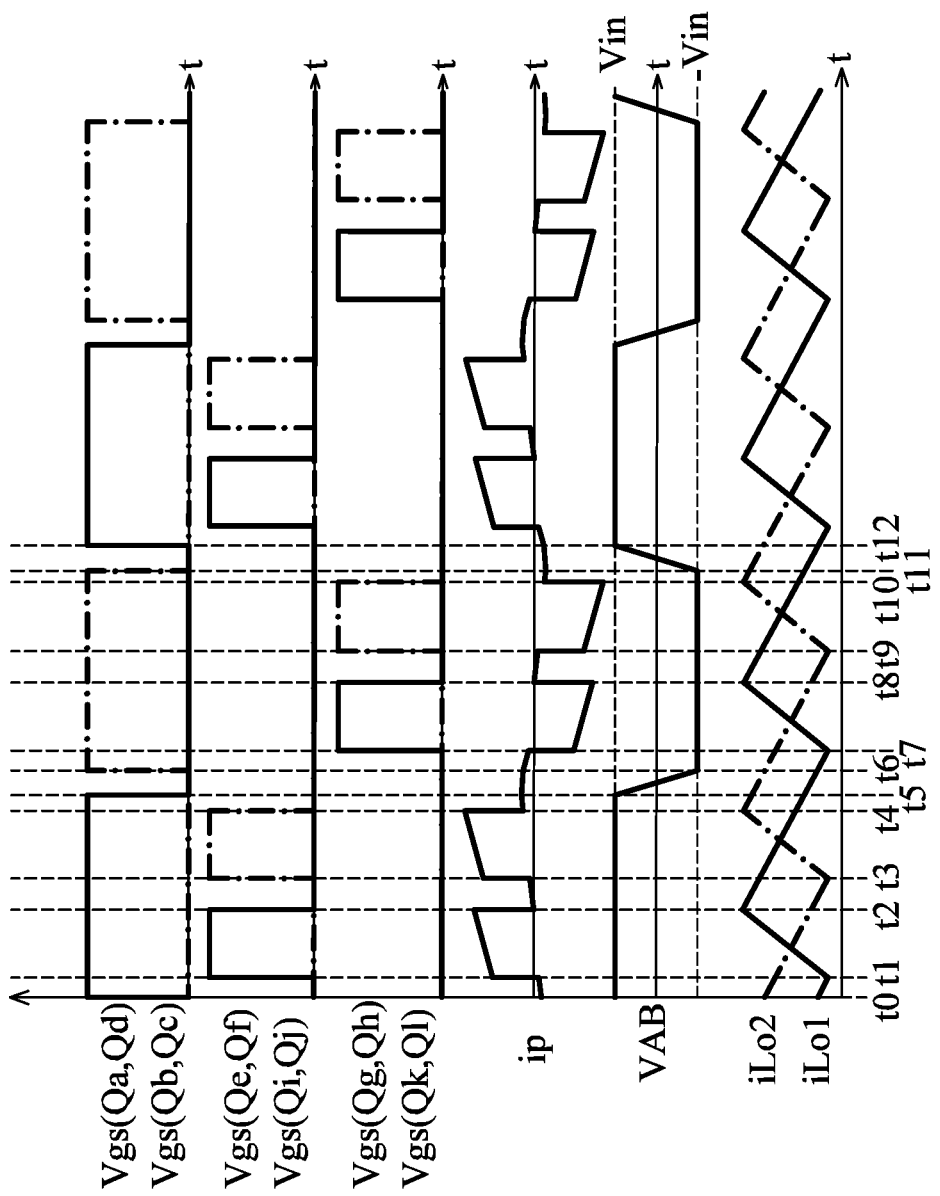
FIG. 2 is a signal timing diagram of the full bridge converter having a wide output voltage range according to an embodiment of the present disclosure.

Reference is further made to FIG. 2, which is a signal timing diagram of the full bridge converter having a wide output voltage range according to an embodiment of the present disclosure. In circuit operation, the first power switch Qa, the fourth power switch Qd and the second power switch Qb, the third power switch Qc are controlled by same duty cycles and complementary control signals, and duty cycles of the first power switch Qa, the fourth power switch Qd, and the second power switch Qb, the third power switch Qc must not be greater than 50%, respectively, and an appropriate dead time must be reserved to ensure that the upper bridge switch circuit B1 and the lower bridge switch circuit B2 will not be turned on at the same time.

In other words, the control circuit 20, according to the duty cycle, controls the first power switch Qa and the fourth power switch Qd to be turned on through the control signals Vgs (Qa, Qd) during a positive half cycle, and controls the second power switch Qb and the third power switch Qc to be turned on through control signals Vgs (Qb, Qc) during a negative half cycle. During the positive half cycle, the control module 20 controls the first AC switch acs1 and the third AC switch acs3 to be sequentially turned on through control signals Vgs (Qe, Qf) and Vgs (Qi, Qj), and on-times of the first AC switch acs1 and the third AC switch acs3 do not overlap.

During the negative half cycle, the control module 20 controls the second AC switch acs2 and the fourth AC switch acs4 to be sequentially turned on through control signals Vgs (Qg, Qh) and Vgs (Qk, Ql), and on-times of the second AC switch acs2 and the fourth AC switches acs4 do not overlap.

On the other hand, the control module 20 controls the first AC switch acs1 and the third AC switch acs3 to be turned on only during the positive half cycle, and controls the second AC switch acs2 and the fourth AC switch acs4 to be turned on only during the negative half cycle. Ideally, all AC switches will have the same duty cycle, and phase differences are adjusted to reduce an overlapping area of the duty cycles of the two AC switches in the same half cycle. In this case, given a horizontal axis as time t, and an entire operation cycle includes a positive half cycle and a negative half cycle, which can be divided into twelve phases from time t0 to t12. Since the positive and negative half cycles are symmetrical, only the positive half cycle is described below. Reference is made to FIGS. 3A to 3G, which are schematic circuit operation diagrams of a full bridge converter having a wide output voltage range according to an embodiment of the present disclosure.

[Interval 1: Time t0-Time t1]

Figure 3A:
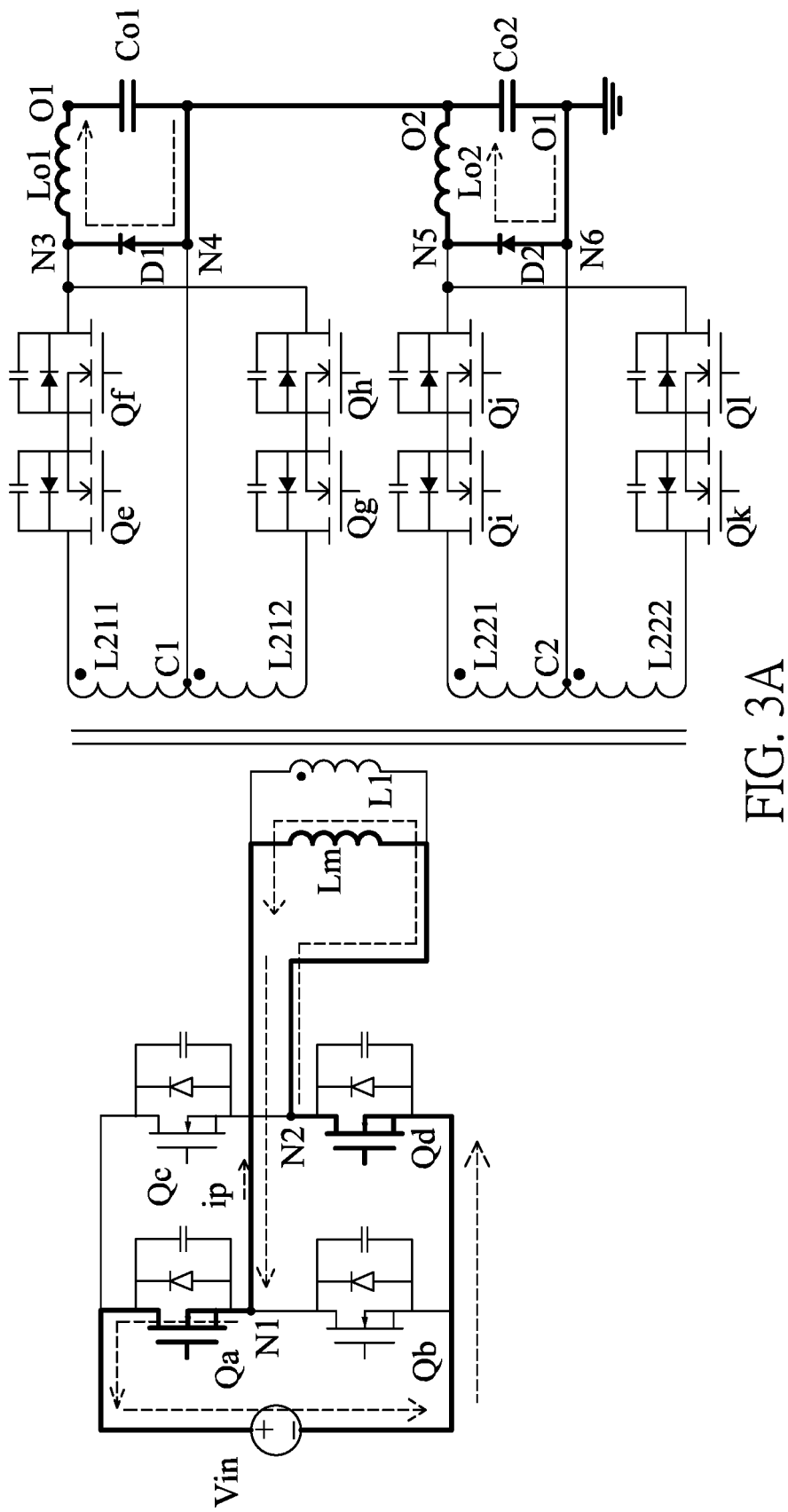
FIGS. 3A to 3G are schematic circuit operation diagrams of a full bridge converter having a wide output voltage range according to an embodiment of the present disclosure.

The first power switch Qa and the fourth power switch Qd are zero voltage switched on at time t0, and the second power switch Qb and the third power switch Qc remain in off state. In order to maintain a continuity, a primary side current ip originally flows through body diodes of the first power switch Qa and the fourth power switch Qd is changed to flow through the first power switch Qa and the fourth power switch Qd themselves, as shown in FIG. 3A. At this time, since the AC switches on the secondary side have not yet turned on, no current is mapped from the secondary side to the primary side. Therefore, the primary side current ip is equal to a current on the excitation inductance Lm, and since a cross-voltage on the excitation inductance Lm is positive, the primary side current ip rises linearly from a negative value.

[Interval 2: Time t1-Time t2]

Figure 3B:
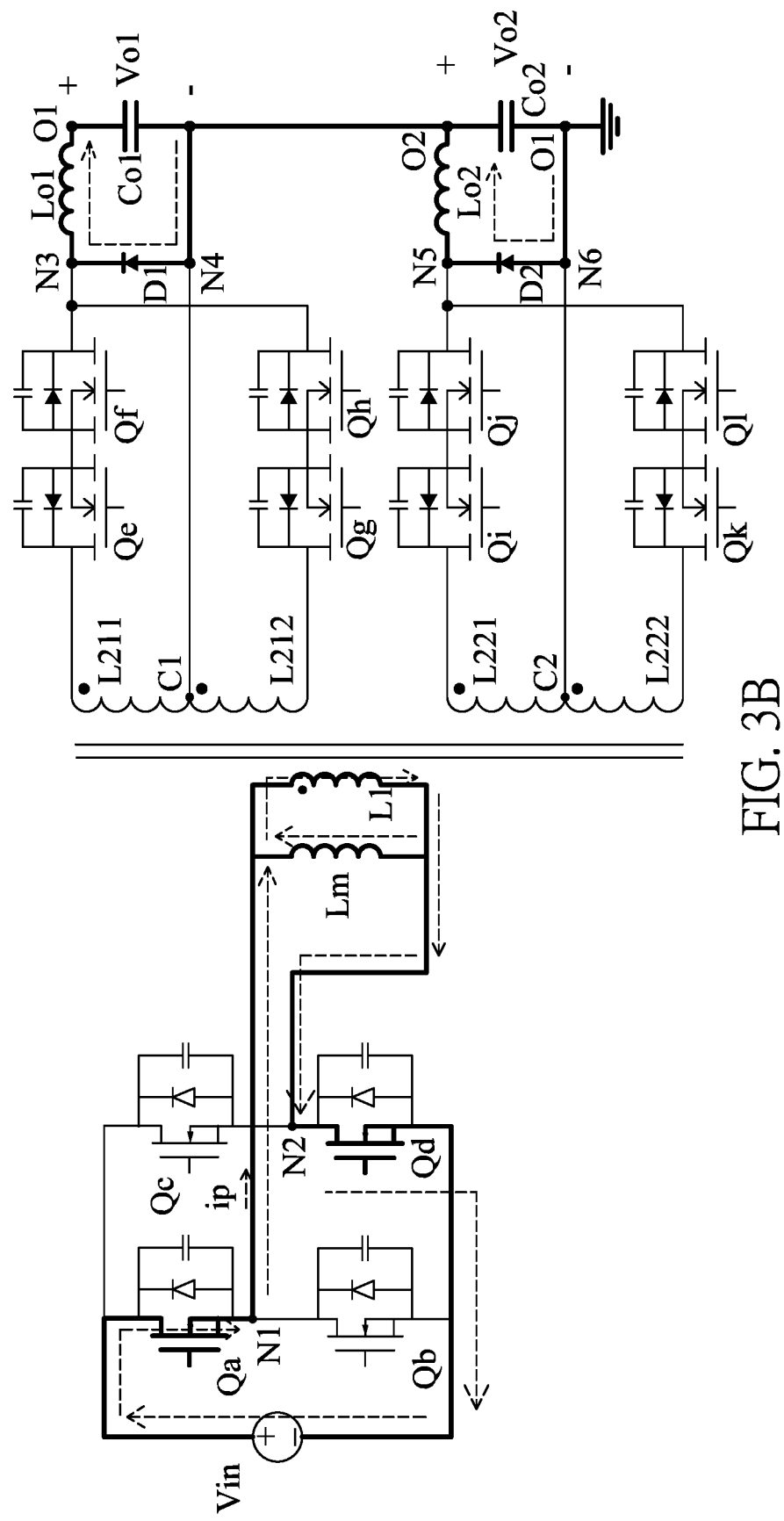

Power switches Qe and Qf of the first AC switch acs1 on the secondary side are turned on at time t1. As shown in FIG. 3B, a cross-voltage VAB on the transformer 12 is +Vin, which is induced to the secondary side to linearly increase an output inductor current ILo1. Since the output inductor current ILo1 operates in a continuous conduction mode (CCM), a positive current is mapped to the primary side, as shown in FIG. 2. At this time, the primary side current Ip=ILm+INp, where ILm is a current on the excitation inductor Lm, and INp is a current on the primary side winding L1. Although the current on the excitation inductor Lm is still negative, but an absolute value thereof is smaller than the current mapped from the secondary side back to the primary side, so that the primary side current ip is reversed. The power switches Qi to Ql remain in off states, therefore a loop formed by the second output inductor Lo2 and the second freewheeling diode D2 continues to provide energy to an output voltage Vo2 of the second set of center-tapped winding.

[Interval 3: Time t2-Time t3]

Figure 3C:
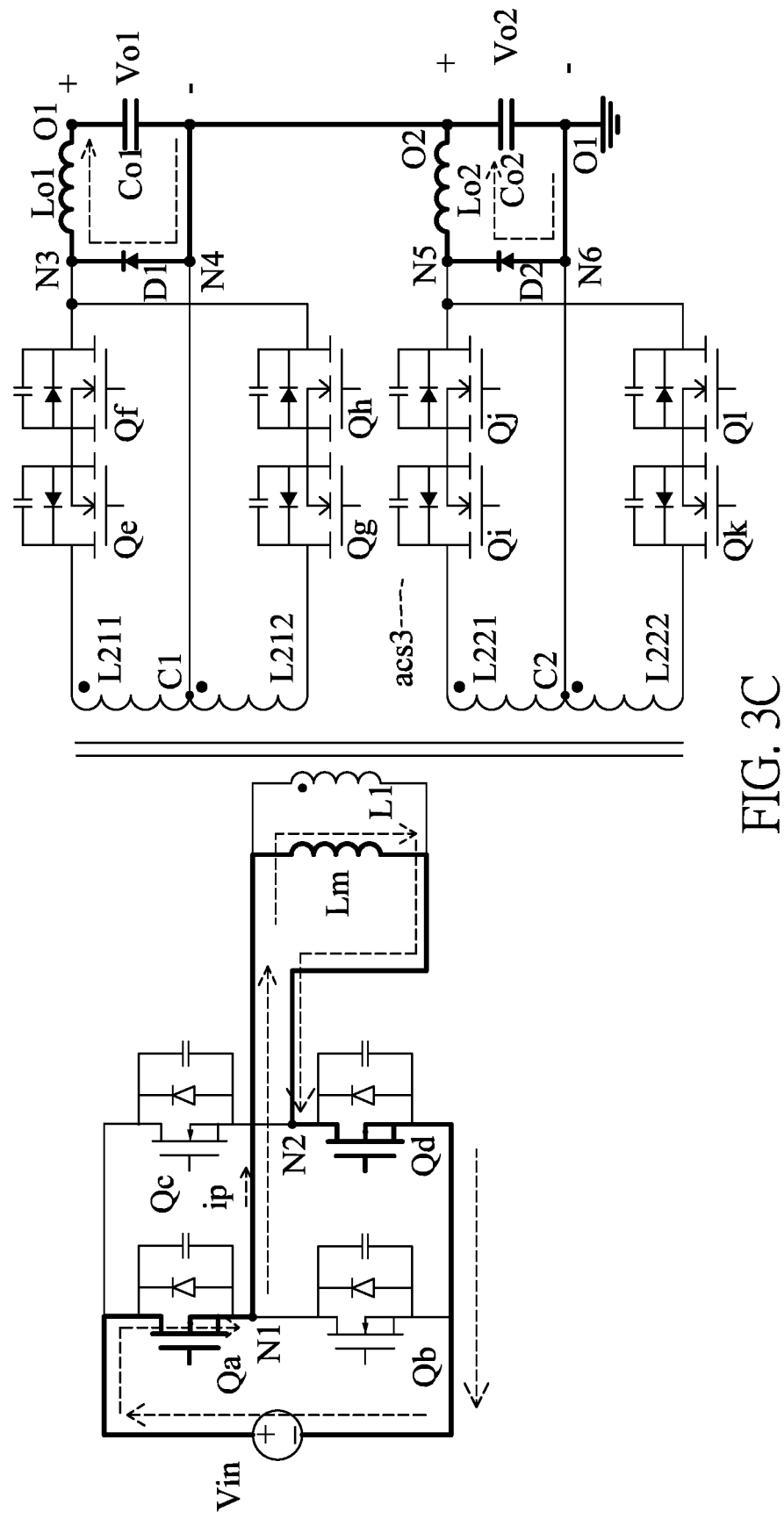

As shown in FIG. 3C, the power switches Qe and Qf of the first AC switch acs1 in this phase are turned off, the primary side stops supplying energy to the secondary side, and an output voltage Vo1 is provided by energy stored by the first output inductor Lo1 in the previous phase. Since no current is mapped back to the primary side, the primary side current ip is now dominated by the current on the excitation inductance Lm. At this time, the current on the excitation inductance Lm continues to increase linearly, from negative to positive, as shown in FIG. 2. In the present interval, since the first AC switch acs1 is turned off, the primary side current is equal to an exciting current.

[Interval 4: Time t3-Time t4]

Figure 3D:
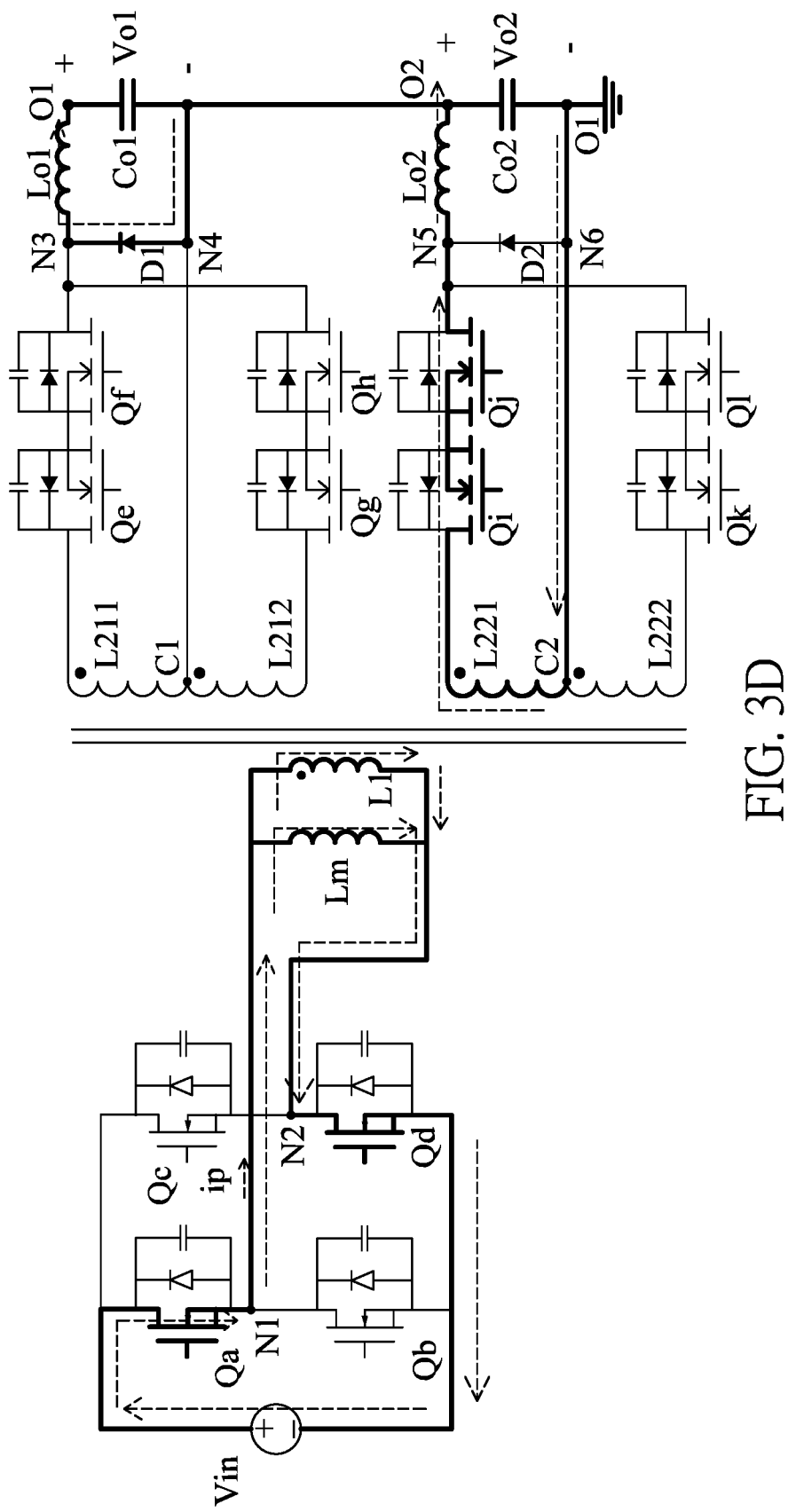

The power switches Qi and Qj of the third AC switch acs3 are turned on at time t3, and the remaining switches maintain in the states of the previous interval. At this time, energy is transmitted to the secondary side through the transformer 12, current flows through the power switches Qi and Qj to the second output inductors Lo2 to store energy, and the output voltage Vo1 is continuously provided with energy by a loop formed by the first output inductor Lo1 and the first freewheeling diode D1, as shown in FIG. 2 and FIG. 3D.

[Interval 5: Time t4-Time t5]

Figure 3E:
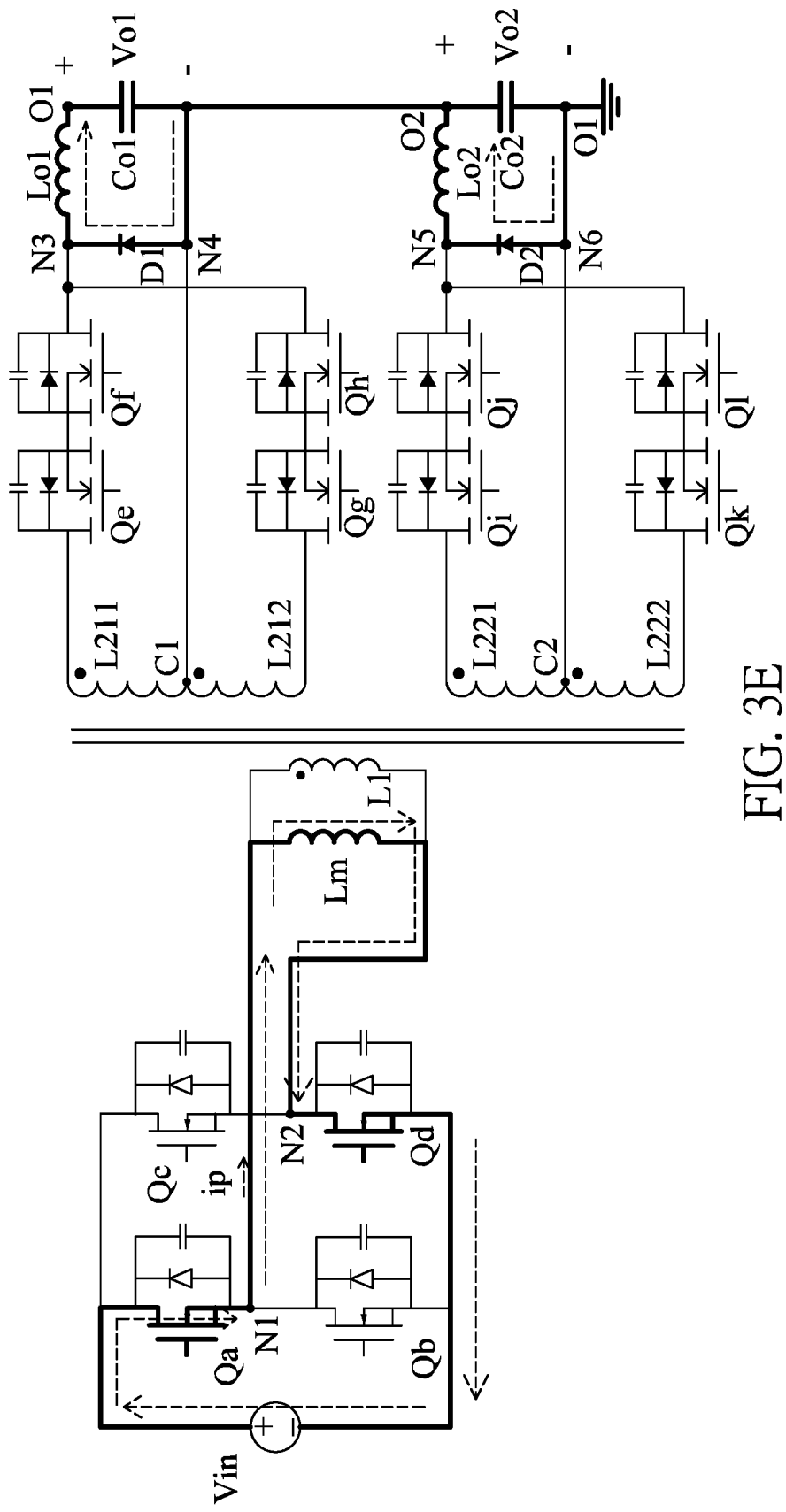

As shown in FIGS. 2 and 3E, the first power switch Qa and the fourth power switch Qd remain in on-state during this interval, and the power switches Qe to Ql are turned off, therefore, no energy is transmitted to the secondary side, and the output voltage is provided with energy stored by the first output inductor Lo1 and the second output inductor Lo2 in the previous state.

[Interval 6: Time t5-Time t6]

Figure 3F:
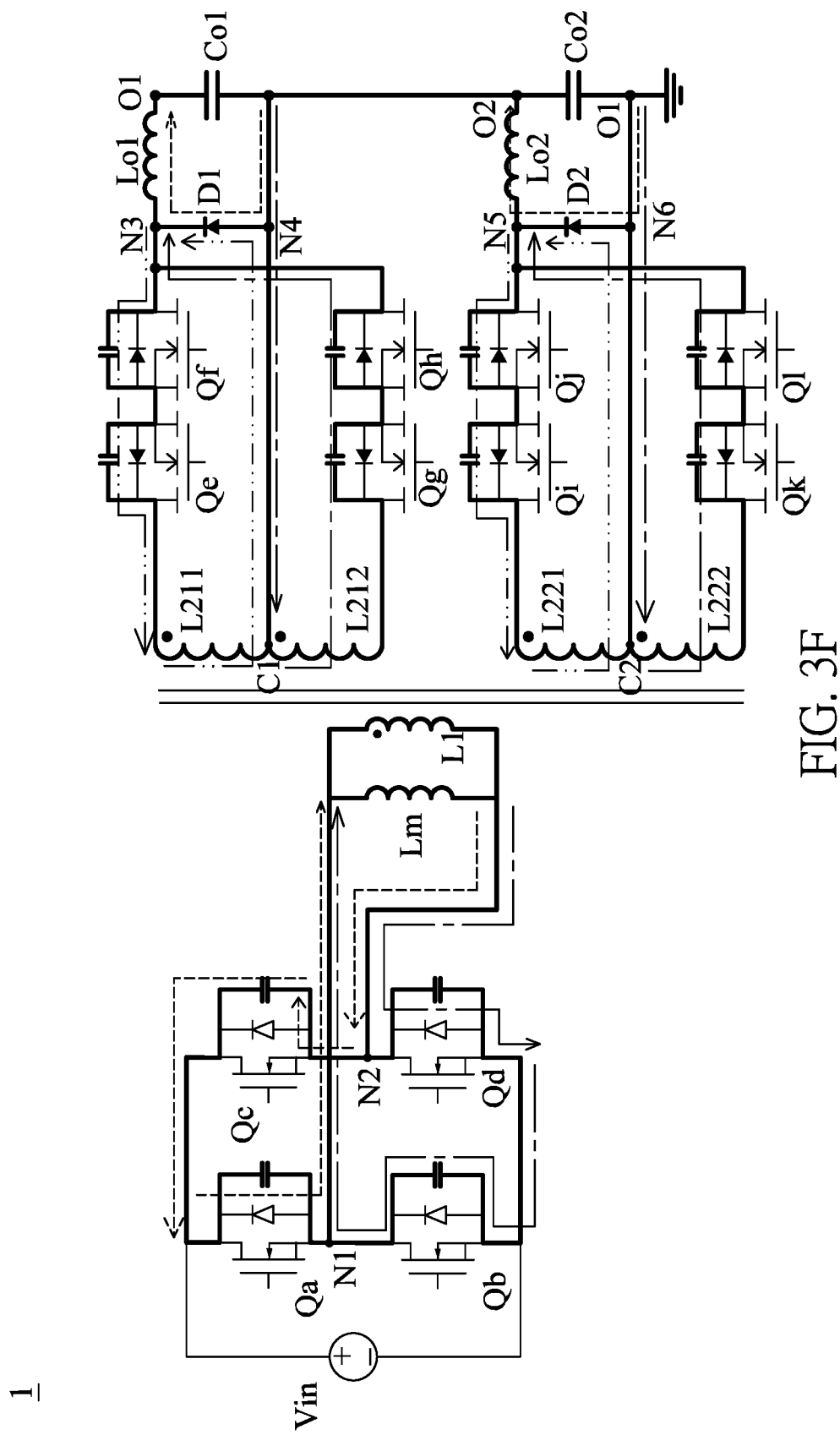

The first power switch Qa and the fourth power switch Qd are turned off at time t5, and the rest of switches also remain in off state of the previous interval. At this time, parasitic capacitors of the first power switch Qa and the fourth power switch Qd are charged from zero volts to +Vin, in order to maintain a sum of cross-voltages of the upper-bridge switch circuit B1 and the lower-bridge switch circuit B2 to be equal to a input voltage of the input power source Vin. Therefore, the parasitic capacitors of the second power switch Qb and the third power switch Qc begin to discharge. Under a premise that parasitic capacitances of the first power switch Qa to the fourth power switch Qd are equal, charging currents and discharging currents of the capacitors will also be equal, so an output current can be ignored in a current path on the primary side of this interval, as shown in FIG. 3F.

Figure 3G:
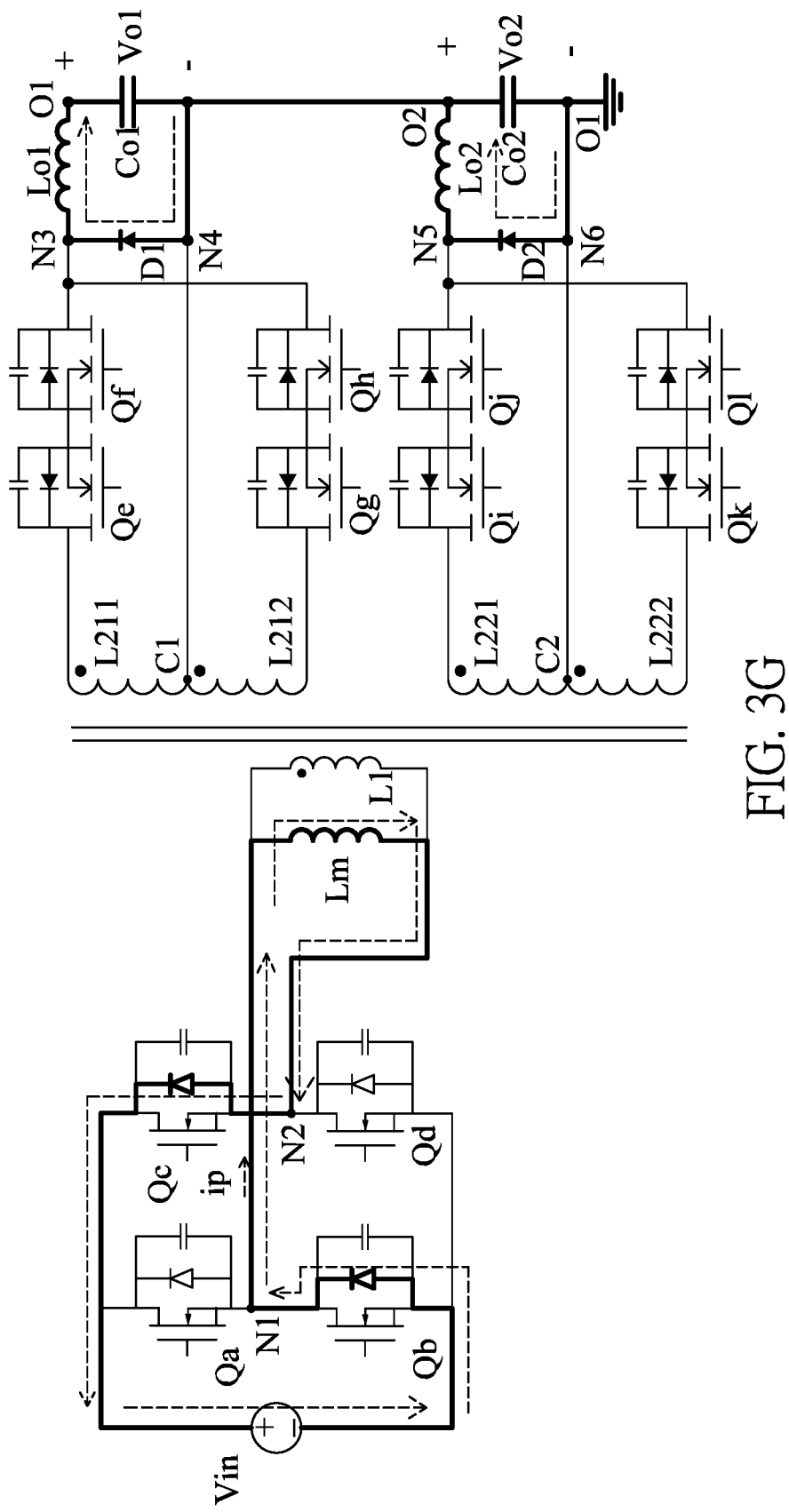

At this time, the cross-voltage VAB on the primary side of the transformer 12 starts to decrease linearly from +Vin, and drops to −Vin at time t6. Due to a change of the cross-voltage VAB on the primary side, a cross-voltage of the AC switches on the secondary side also change, causing parasitic capacitors of the power switches Qe, Qh, Qi, and Ql start to discharge from +Vs to zero, and parasitic capacitors of the power switches Qf, Qg, Qj, and Qk are charged from zero volts to +Vs. As shown in FIG. 3G, when the parasitic capacitors of the second power switch Qb and the third power switch Qc are discharged to zero volts, currents are changed to flow through body diodes of the second power switch Qb and the third power switch Qc. When the second power switch Qb and the third power switch Qc are turned on in next interval, zero voltage switching can be completed.

In the present interval, energy on the parasitic capacitors of the switches is released through energy storage of the excitation inductance Lm to achieve zero voltage switching of the power switches of the primary side. A condition for achieving zero voltage switching is that energy EL stored in the magnetizing inductance Lm needs to be sufficient to offset energy EC required by the parasitic capacitors, that is, $E_L \geq E_C$. In addition to a need to store sufficient energy for the magnetizing inductance Lm, a dead time must be sufficient to achieve the zero voltage switching condition, and the dead time must be greater than a quarter of a resonance period.

On the other hand, the present circuit architecture adjusts an output voltage gain by adjusting the duty cycle of the AC switch on the secondary side. In another embodiment of the present disclosure, when the output voltage is higher, the duty cycles of the AC switch will have overlapping intervals, which are slightly different from the operation intervals described above, so the overlapping intervals of the duty cycles will be described here.

Figure 4:
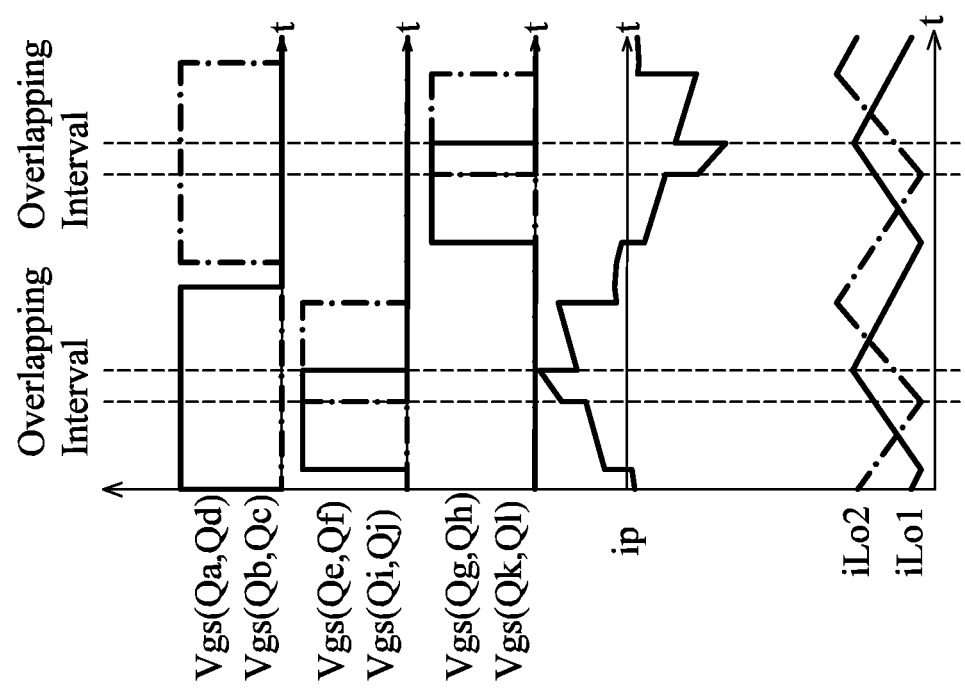
FIG. 4 is a signal timing diagram of the full bridge converter having a wide output voltage range according to another embodiment of the present disclosure.
Figure 5:
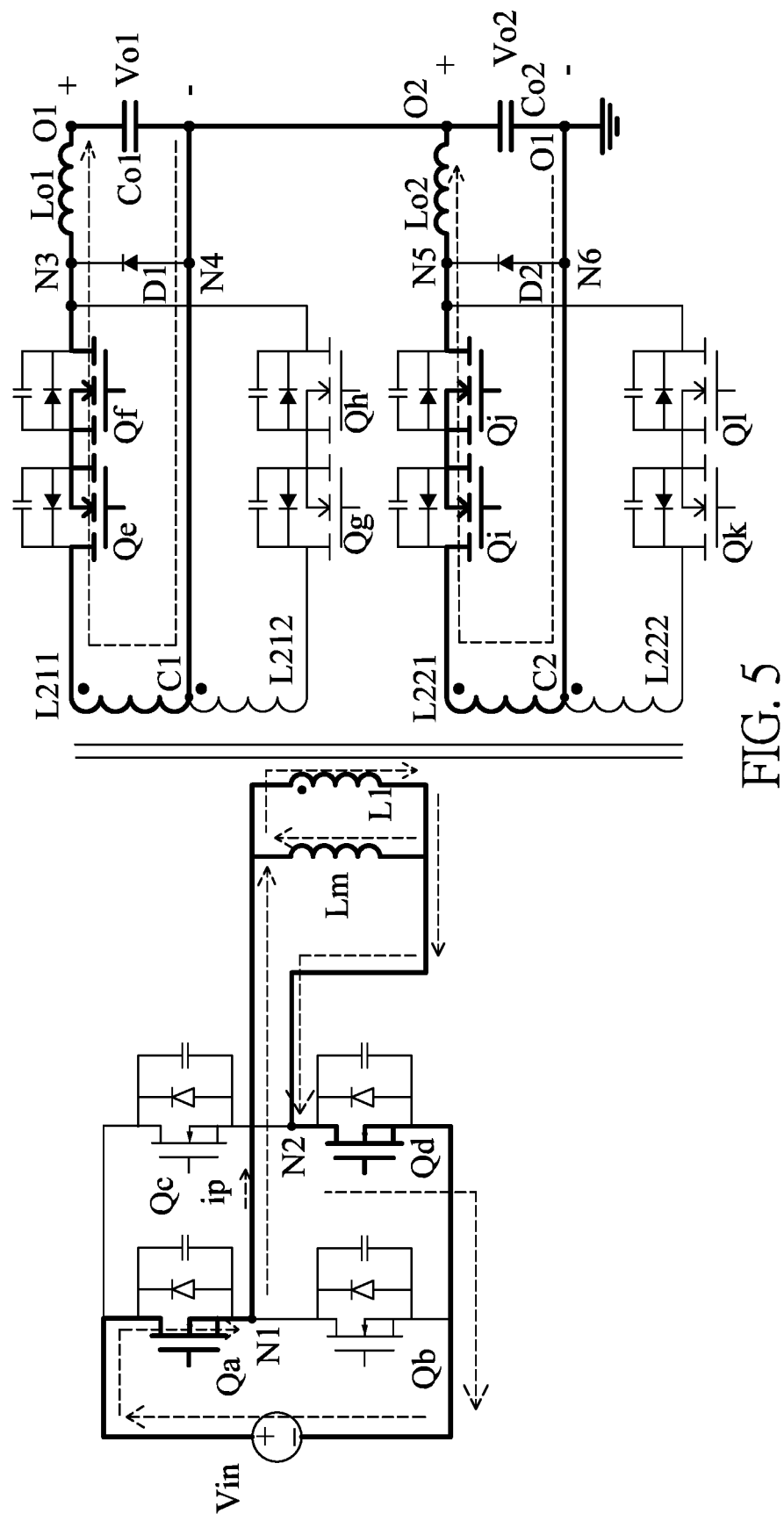
FIG. 5 is a schematic diagram of a circuit operation of a full bridge converter having a wide output voltage range according to another embodiment of the present disclosure.

Reference is further made to FIGS. 4 and 5, which are a signal timing diagram and a schematic diagram of a circuit operation of the full bridge converter having a wide output voltage range according to another embodiment of the present disclosure.

In the present embodiment, the control module 20 controls the first AC switch acs1 and the third AC switch acs3 to be sequentially turned on through the control signals Vgs (Qe, Qf) and Vgs (Qi, Qj) during the positive half cycle, and on-times of the AC switch acs1 and the third AC switch acs3 partially overlap.

On the other hand, during the negative half cycle, the control module 20 controls the second AC switch acs2 and the fourth AC switch acs4 to be sequentially turned on through the control signals Vgs (Qg, Qh) and Vgs (Qk, Ql), and on-times of the second AC switch acs2 and the fourth AC switch acs4 partially overlap.

As shown in FIG. 4 and FIG. 5, at this time, the power switches Qe and Qf of the first AC switch acs1 and the power switches Qi and Qj of the third AC switch acs3 are turned on. The first output inductor Lo1 and the second output inductor Lo2 store energy simultaneously, and currents are simultaneously mapped to the primary side. It can be seen from FIG. 4 that in this overlapping interval, a peak value of the primary current will be higher than that when the duty cycles are not overlapped, and an effective current value will also increase.

In conclusion, the full bridge converter having a wide output voltage range provided by the present disclosure limits an occurrence of freewheeling by using AC switches, provides discharge paths by adding two freewheeling diodes to a rectifier, and connects an output capacitor in series, thereby providing a higher output voltage without increasing a turns ratio of the transformer to achieve an application for a wide range of an output voltage.

In addition, in the full bridge converter having the wide output voltage range provided by the present disclosure, two power switches constituting the AC switch will be given same control signals, and times at which energy being transferred to two groups of the secondary side can be staggered, thereby reducing a current stress and a component loss of the primary side. Moreover, the circuit design can make the power switches of the primary side achieve zero voltage switching (ZVS). Compared with the LLC-SRC, this architecture can integrate two stages of circuit into a single stage, which is much simpler to be controlled.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A full bridge converter having a wide output voltage range, the full bridge converter comprising:
    an input power source;
    a full bridge switching circuit coupled to the input power source;
    a transformer coupled to the full bridge switching circuit and including:
        a magnetic core;
        a primary side winding wound on a primary side of the magnetic core; and
        a first secondary side winding and a second secondary side winding wound on a secondary side of the magnetic core;
    a first rectifying circuit connected to the transformer and including:
        a first AC switch connected between one end of the first secondary side winding and a third node;
        a second AC switch connected between another end of the first secondary side winding and the third node; and
        a first freewheeling diode connected between the third node and a fourth node, wherein the fourth node is connected to a first center point of the first secondary side winding;
    a second rectifying circuit connected to the transformer and including:
        a third AC switch connected between one end of the second secondary side winding and a fifth node;
        a fourth AC switch connected between another end of the second secondary side winding and the fifth node; and
        a second freewheeling diode connected between the fifth node and a sixth node, wherein the sixth node is connected to a second center point of the second secondary side winding;
    a first output circuit connected between the third node and the fourth node, including a first output inductor and a first output capacitor, and having a first output node;
    a second output circuit connected to the first output circuit and between the fifth node and the sixth node, wherein the second output circuit includes a second output inductor and a second output capacitor, and has a second output node; and
    a control circuit configured to, according to a duty cycle, control the first AC switch and the third AC switch to be turned on during a positive half cycle, and control the second AC switch and the fourth AC switch during a negative half cycle.

2. The full bridge converter according to claim 1, wherein the full bridge switching circuit includes an upper bridge circuit and a lower bridge circuit connected in parallel, wherein the upper bridge circuit includes a first power switch and a second power switch connected to the first power switch through a first node, the lower bridge circuit includes a third power switch and a fourth power switch connected to the third power switch through a second node, and wherein the primary side winding is connected between the first node and the second node.

3. The full bridge converter according to claim 2, wherein the control circuit is configured to, according to the duty cycle, control the first power switch and the fourth power switch to be turned on during the positive half cycle, and control the second power switch and the third power switch to be turned on during the negative half cycle.

4. The full bridge converter according to claim 3, wherein during the positive half cycle, on-times of the first power switch and the fourth power switch are less than or equal to 50% of the duty cycle, and during the negative half cycle, on-times of the second power switch and the third power switch are less than or equal to 50% of the duty cycle.

5. The full bridge converter according to claim 4, wherein the control circuit is configured to control the first AC switch and the third AC switch to be sequentially turned on during the positive half cycle, and on-times of the first AC switch and the third AC switch do not overlap, and
    wherein the control circuit is configured to control the second AC switch and the fourth AC switch to be sequentially turned on during the negative half cycle, and on-times of the second AC switch and the fourth AC switch do not overlap.

6. The full bridge converter according to claim 4, wherein the control circuit is configured to control the first AC switch and the third AC switch to be sequentially turned on during the positive half cycle, and on-times of the first AC switch and the third AC switch partially overlap, and
    wherein the control circuit is configured to control the first AC switch and the third AC switch to be sequentially turned on during the negative half cycle, and on-times of the first AC switch and the third AC switch partially overlap.

7. The full bridge converter according to claim 4, wherein the on-time of the first power switch or the fourth power switch and the on-time of the second power switch or the third power switch are separated by a dead time.

8. The full bridge converter according to claim 7, wherein during the dead time, the control module is configured to control the first to the fourth power switches and the first to the fourth AC switches to be turned off.

9. The full bridge converter according to claim 4, wherein the on-times of the first power switch and the fourth power switch are the same, and the on-times of the second power switch and the third power switch are the same.

10. The full bridge converter according to claim 4, wherein each of the first to the fourth AC switches includes two power switches connected in reverse series.

* * * * *